United States Patent
Euler et al.

(10) Patent No.: US 11,437,926 B2
(45) Date of Patent: Sep. 6, 2022

(54) METHOD FOR OPERATING A CONTROLLABLE ELECTRICAL DEVICE, AND ASSEMBLY HAVING THE CONTROLLABLE ELECTRICAL DEVICE

(71) Applicant: Siemens Energy Global GmbH & Co. KG, Munich (DE)

(72) Inventors: Ingo Euler, Erlangen (DE); Daniel Schmitt, Postbauer-Heng (DE); Frank Schremmer, Fuerth (DE); Marcus Wahle, Veitsbronn (DE); Steffen Pierstorf, Nuremberg (DE); Torsten Stoltze, Herzogenaurach (DE); Daniel Boehme, Nuremberg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/261,246

(22) PCT Filed: Jul. 17, 2018

(86) PCT No.: PCT/EP2018/069420
§ 371 (c)(1),
(2) Date: Jan. 19, 2021

(87) PCT Pub. No.: WO2020/015823
PCT Pub. Date: Jan. 23, 2020

(65) Prior Publication Data
US 2021/0281190 A1    Sep. 9, 2021

(51) Int. Cl.
| H05B 33/08 | (2020.01) |
| H02M 7/48 | (2007.01) |
| H04Q 11/00 | (2006.01) |

(52) U.S. Cl.
CPC .............. *H02M 7/48* (2013.01); *H04Q 11/00* (2013.01)

(58) Field of Classification Search
CPC ... H04L 12/40; H04L 12/40039; H04Q 11/04; H02M 7/483; H02M 7/4835; H02M 7/48; H02M 1/0845
See application file for complete search history.

(56) References Cited

U.S. PATENT DOCUMENTS

| 7,158,869 B2 | 1/2007 | Vollmer et al. |
| 9,608,544 B2 | 3/2017 | Schuler et al. |

(Continued)

FOREIGN PATENT DOCUMENTS

| DE | 10031891 A1 | 1/2002 |
| DE | 102012216469 A1 | 3/2014 |

(Continued)

*Primary Examiner* — Jared Fureman
*Assistant Examiner* — Esayas G Yeshaw
(74) *Attorney, Agent, or Firm* — Laurence A. Greenberg; Werner H. Stemer; Ralph E. Locher

(57) ABSTRACT

A method for operating a controllable electrical device connected by a data link to a control device for controlling the electrical device, includes using the electrical device to exchange electrical power with a connected electrical grid and using an environmental sensor for collecting environmental information. The control device transmits control signals to the electrical device over the data link. The electrical device assumes a first or a second operating state depending on the control signals transmitted. The electrical device exchanges energy with the electrical grid in the first operating state and the electrical device does not exchange energy with the electrical grid in the second operating state. Environmental information collected by the environmental sensor is transmitted over the data link to the control device only when the electrical device is in the second operating state. An assembly for carrying out the method is also provided.

15 Claims, 1 Drawing Sheet

(56) References Cited

U.S. PATENT DOCUMENTS

| | | | |
|---|---|---|---|
| 10,473,728 B2 | 11/2019 | Goetz | |
| 10,879,727 B1* | 12/2020 | Cooper | H02J 3/007 |
| 2006/0125623 A1* | 6/2006 | Appelt | A61B 5/02055 |
| | | | 340/521 |
| 2015/0042230 A1* | 2/2015 | Arulandu | H05B 45/58 |
| | | | 315/122 |
| 2018/0157956 A1* | 6/2018 | Tchakerian | H02J 7/00047 |
| 2019/0036176 A1* | 1/2019 | Lee | H01M 10/486 |
| 2019/0097466 A1* | 3/2019 | Floresta | H02P 6/04 |

FOREIGN PATENT DOCUMENTS

| | | |
|---|---|---|
| DE | 202014004749 U1 | 9/2015 |
| EP | 1892631 A2 | 2/2008 |
| KR | 20130077013 A | 7/2013 |

\* cited by examiner

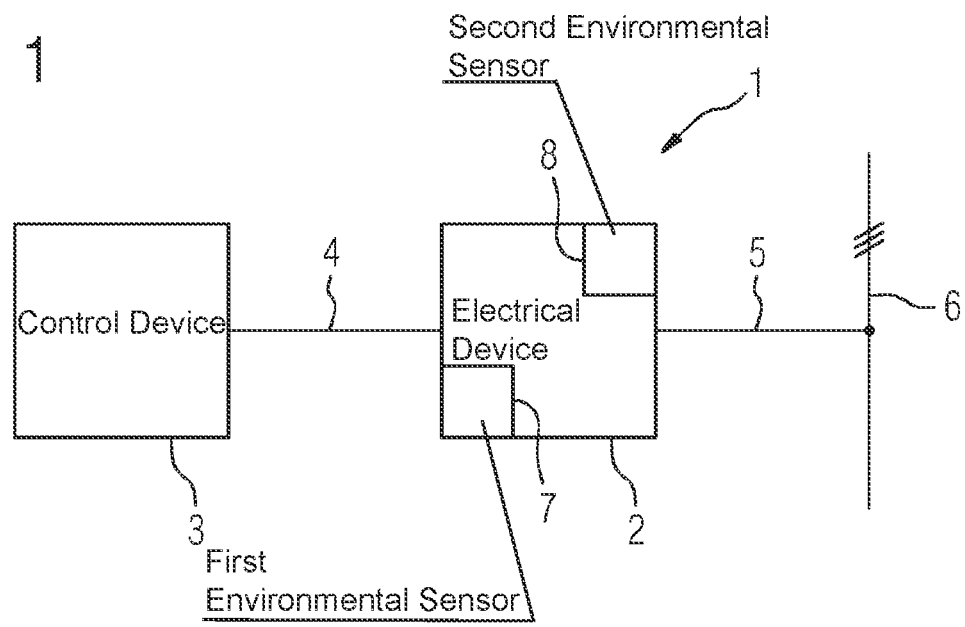
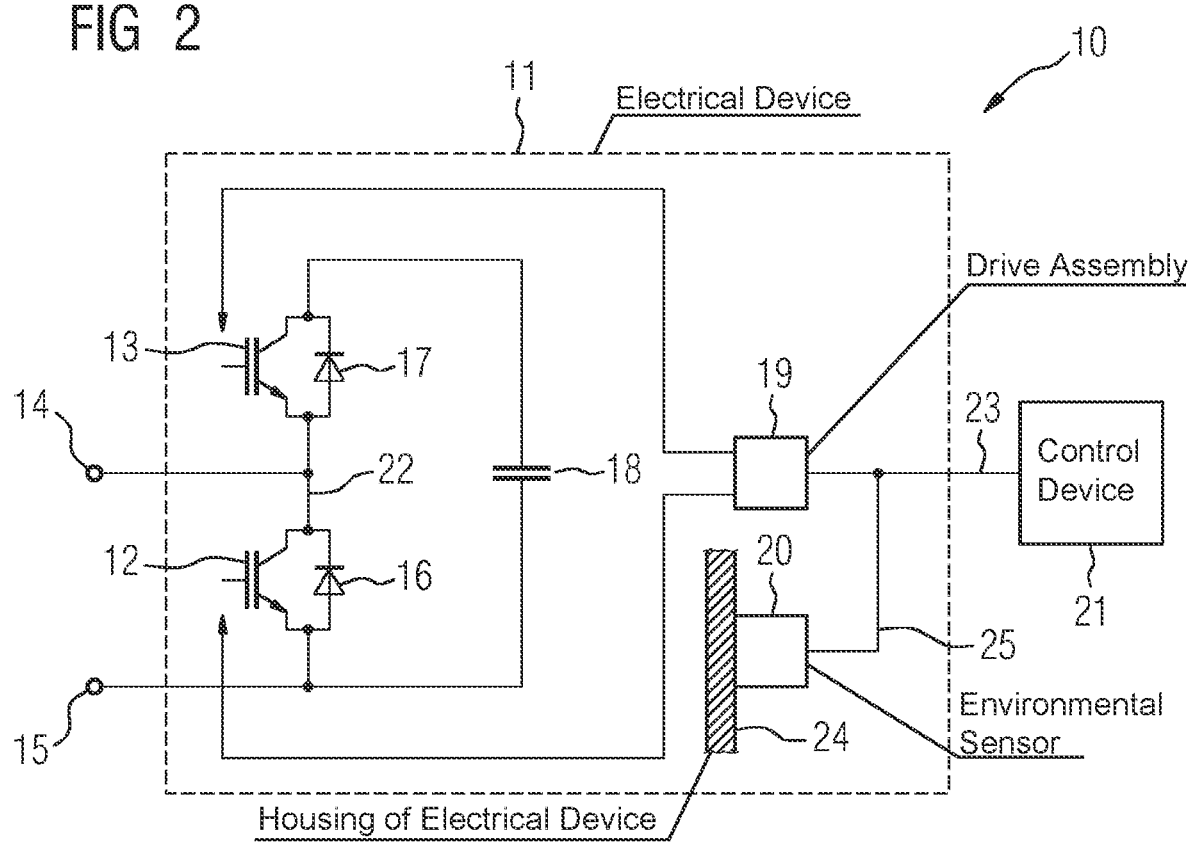

METHOD FOR OPERATING A CONTROLLABLE ELECTRICAL DEVICE, AND ASSEMBLY HAVING THE CONTROLLABLE ELECTRICAL DEVICE

BACKGROUND OF THE INVENTION

Field of the Invention

The invention relates to a method for operating a controllable electrical device.

Controllable electrical devices are generally those which are amenable to open-loop and/or closed-loop control by a superordinate control device. For example, a controllable electrical device may comprise controllable components such as controllable switches, with the result that the control of the electrical device can take place by means of control of the controllable components.

For control of the electrical device, data communication takes place between the electrical device and the control device. The data communication usually comprises control signals, which are transmitted from the control device to the electrical device. This data communication can, depending on the application, necessitate transmission of control signals in very short time intervals, which may be in the range of less than 100 microseconds. The data rate of the data communication is in this case correspondingly high.

In particular in the high-voltage engineering sector, controllable electrical devices are often connected to an electrical power supply system, for example a supply grid. Often, the electrical devices are designed to exchange electrical energy or power with the power supply system, such as, for example, in the case of reactive power compensation devices or the like. In this case, the control device can perform open-loop or closed-loop control of the energy exchange between the electrical device and the power supply system. However, this in turn requires very high data rates for the data to be transmitted between the electrical device and the control device.

Generally, controllable electrical devices, in particular in the high-voltage engineering sector, are relatively cost-intensive. With the high costs involved in the production, the startup and the operation of such electrical devices, there is an increased interest in as high a reliability of the devices as possible. In this way, costs for the operation and maintenance of said devices can be optimized.

SUMMARY OF THE INVENTION

The object of the invention therefore consists in proposing a method for operating a controllable electrical device which enables operation of the device which is as reliable and at the same time as cost-effective as possible.

The object is achieved according to the invention by a method for operating a controllable electrical device, which is connected, by means of a data link, to a control device for controlling the electrical device, wherein the electrical device is designed to exchange electrical energy with a connected electrical power supply system and comprises an environmental sensor for detecting environmental information, in which the control device transmits, by means of the data link, control signals to the electrical device, the electrical device assumes, depending on the transmitted control signals, a first or a second operating state, wherein, in its first operating state, the electrical device exchanges energy with the electrical power supply system, and, in its second operating state, the electrical device does not exchange any energy with the electrical power supply system, wherein the environmental information detected by means of the environmental sensor is transmitted via the data link to the control device only when the electrical device is in the second operating state. Accordingly, in accordance with the invention, only the second operating state is used for transmitting environmental information. In particular, no environmental information is transmitted when the electrical device is in the first operating state.

In accordance with the invention, the electrical device is equipped with an environmental sensor, which can obtain specific measured data from the environment of the electrical device. Environmental information in this connection should be understood to mean that it does not include the electrical operating state of the electrical device, i.e., for example, a current flowing through the electrical device or through the components thereof, or a voltage present at these components or else states of the switches contained therein. Instead, the environmental information is data which can be obtained from observation of an environment, in particular an immediate environment of the electrical device. This also includes measured data detection outside, inside or at an outer housing of the electrical device as well. Examples of this may be temperature measurements of an external temperature in an immediate environment of the electrical device or measurements of vibrations at the housing. The environmental information is detected and made available to the control device. By virtue of the additional information, advantageously the reliability of the electrical device can be increased. It is in particular possible, for example, to determine a present general state of ageing of the electrical device and to evaluate this and to plan maintenance cycles. Within the scope of the invention, it is of course permissible if not every phase during which the electrical device is in the second operating state is used to transmit environmental information. Instead, it is conceivable to use a few selected phases for this.

Likewise, the environmental information and the control signals are exchanged or transmitted by means of the same data link. In this way, the costs of the electrical device can advantageously be minimized because it is possible to dispense with additional communications infrastructure for transmitting the environmental information. The transmission of the control signals generally does subject the data link to a full load, with the result that transmission of additional environmental information over the same data link is not possible without further measures. However, in relation to this aspect, it has been identified within the scope of the invention that this loading is nonuniform, with the result that the second operating state of the electrical device provides a possibility for using the data link for transmission of the environmental information as well. The reason for this consists in that, in the first operating state, i.e. while the electrical device exchanges energy with the connected power supply system, a temporally intensive control needs to take place by means of the control device, while in the second operating state, the electrical device does not participate in any energy exchange, with the result that it is in a sort of inactive state and therefore needs to be controlled temporally less intensively. Additionally, in this case the circumstance can be used whereby the environmental information undergoes a comparatively slow change which is not in the time range of the control signals (milliseconds range). The transmission of the environmental information can take place in each case on request by the control device or else unrequested.

In a suitable manner, the electrical device transmits, via the data link, status information to the control device. The control device in this case generates the control signals taking into consideration the status information. The control of the electrical device accordingly takes place via feedback and provision of status information. The status information is expediently obtained by means of current and voltage measurement. The control is in this way particularly effective, wherein the data traffic over the data link is increased. The status information is expediently transmitted in time intervals in the microseconds range. In this case, the corresponding transmission rate in the first operating state of the electrical device is preferably higher than in its second operating state.

In accordance with one embodiment of the invention, the environmental information and the status information are transmitted in mutually alternating data packets. While the electrical device is in the second operating state, accordingly the environmental information and the status information are alternately transmitted in a multiplexing method. Thus, the environmental information can be made available efficiently without any losses in the transmission rate of the status information.

In some applications, it may be advantageous if the environmental information, prior to being transmitted to the control device, is processed by means of a data-processing device and/or is buffer-stored by means of a data storage unit of the electrical device, wherein the processed and/or buffer-stored environmental information is transmitted to the control device. The processing may be, for example, mean-value generation, low-pass filtering or the like. The change in the environmental measured data over time generally takes place comparatively slowly, with the result that, under certain circumstances, not every measured value needs to be transmitted. The data traffic can thus advantageously be reduced.

In a suitable manner, a quantity of energy which can be exchanged with the power supply system can be determined from voltage and/or current values measured at the electrical device. This information and/or also information on the operating state of the electrical device (for example operating state one or two) can be transmitted, as status information, to the control device.

As environmental information, for example, a temperature, a mechanical vibration, an air humidity and/or an air pressure at the electrical device can be transmitted. The environmental information can take place as transmission of individual measured values or in data blocks. In the former case, advantageously the transmission of control signals and/or status information is only interrupted for a relatively short time. In the latter case, advantageously a relatively high data density of the environmental information is made possible.

In accordance with one embodiment of the invention, the electrical device comprises semiconductor switches which can be switched off, wherein the switching states of the semiconductor switches, as status information, are transmitted.

Preferably, the electrical device comprises an energy store, by means of which the electrical device, in its first operating state, exchanges energy with the electrical power supply system, and which, in the second operating state of the electrical device, is bypassed, with the result that there is no energy exchange between the electrical device and the electrical power supply system. The quantity of energy which can be exchanged can in this case be the voltage drop across the energy store, for example a capacitor. Bypassing of the energy store is a particularly simple possibility for realizing the second operating state of the electrical device. The voltage state of the energy store changes particularly quickly when the energy store draws energy from the power supply system or outputs energy to the power supply system. The quick change in the voltage state in turn requires a high transmission rate of status information. If the energy store is bypassed, this can be used for transmitting the environmental information.

In addition, the invention relates to an assembly comprising a controllable electrical device, which is connected, by means of a data link, to a control device for controlling the electrical device, wherein the electrical device is designed to exchange electrical energy with a connected electrical power supply system, wherein the control device is designed to transmit, by means of the data link, control signals to the electrical device, the electrical device is designed to assume, depending on the transmitted control signals, a first or a second operating state, wherein, in its first operating state, the electrical device can exchange energy with the electrical power supply system, and, in its second operating state, the electrical device cannot exchange any energy with the electrical power supply system.

Such an assembly is known in the form of a modular multilevel converter from the prior art. A modular multilevel converter has a modular design and comprises series-connected switching modules, which each comprise semiconductor switches which can be switched off and an energy store. During operation of the modular multilevel converter, the energy stores of the switching modules are charged or discharged, wherein a voltage preset by a central open-loop and closed-loop control unit is generated at the output of the multilevel converter.

The object of the invention consists in specifying an assembly of this nature which is as reliable and cost-effective as possible.

The object is achieved in the case of an assembly of this nature in accordance with the invention by virtue of the fact that the electrical device comprises an environmental sensor for detecting environmental information and is designed to transmit the environmental information detected by means of the environmental sensor via the data link to the control device only when the electrical device is in the second operating state.

The electrical power supply system which can be connected to the assembly can be both an AC voltage power supply system and a DC voltage link or a DC voltage power supply system.

The assembly can additionally be connectable to a plurality of electrical power supply systems. For example, the assembly can be a converter with an AC voltage side and a DC voltage side, wherein the AC voltage side can be connectable to an AC voltage line, and the DC voltage side can be connectable to a DC voltage line. Depending on the configuration of the assembly and the control thereof, the exchange of electrical energy between the electrical device and the connected electrical power supply system can effect an active and/or reactive power change in the power supply system.

Expediently, the electrical device comprises a data-processing device and/or a data storage unit, wherein the environmental information, prior to being transmitted to the control device, is processed by means of a data-processing device and/or can be buffer-stored by means of a data storage unit of the electrical device, wherein the processed and/or buffer-stored environmental information can be transmitted to the control device.

The advantages of the assembly according to the invention become apparent in particular from the advantages which have already been described above in connection with the method according to the invention.

In accordance with one embodiment of the invention, the environmental sensor is designed to detect a temperature, a mechanical vibration, an air humidity and/or an air pressure at the electrical device and to make this information available, as environmental information, to the electrical device. The environmental sensor, wherein also a plurality of environmental sensors is conceivable, advantageously has an interface, which enables a connection to the data link, for example a fiberoptic conductor link.

Preferably, the electrical device comprises semiconductor switches which can be switched off, wherein, as status information, switching states of the semiconductor switches can be transmitted. The semiconductor switches may be, for example, IGBTs, IGCTs or the like. The electrical device may also comprise, however, controllable switches, in particular semiconductor switches, such as, for example, thyristors.

In accordance with one embodiment of the assembly, the electrical device comprises an energy store, by means of which the electrical device, in its first operating state, exchanges energy with the electrical power supply system, and which, in the second operating state of the electrical device, is bypassed, with the result that there is no energy exchange between the electrical device and the electrical power supply system. The energy store can be bypassable, for example, by means of a suitable bypass switch. The electrical device can comprise, for example, semiconductor switches and energy stores, which are connected to one another in a half-bridge circuit or full-bridge circuit known to a person skilled in the art or a functionally corresponding circuit.

In accordance with one embodiment of the invention, during operation, the electrical device is at an electrical potential of over 1 kV, the control device is at an electrical potential of less than 100 V, preferably at ground potential, and the data link is a fiberoptic conductor link. In such a case, the fiberoptic conductor link is particularly advantageous because it ensures potential isolation between the high-voltage potential and ground potential. The fiberoptic conductor link may be, for example, an optical waveguide.

In accordance with an advantageous embodiment of the invention, the assembly is a modular multilevel converter comprising a multiplicity of switching modules, and at least one of the switching modules is provided by the electrical device. The switching modules are connected to one another in a series circuit with respect one another so as to form a converter valve of the multilevel converter. The switching modules are controllable individually and independently of one another. A central control device is preferably connected to each of the switching modules by means of a dedicated data link, preferably in the form of a fiberoptic conductor link.

It is of course possible for all of the features and components described in connection with the method according to the invention to be realized individually or in combination also in connection with the assembly according to the invention.

The invention will be explained further below with reference to exemplary embodiments.

BRIEF DESCRIPTION OF THE SEVERAL VIEWS OF THE DRAWING

FIG. 1 shows a first exemplary embodiment of an assembly according to the invention in a schematic illustration;

FIG. 2 shows a second exemplary embodiment of an assembly according to the invention in a schematic illustration.

DETAILED DESCRIPTION OF THE INVENTION

FIG. 1 shows an assembly 1 having a controllable electrical device 2 and a control device 3 for controlling the electrical device 2. The electrical device 2 is connected, by means of a data link 4, to the control device 3.

The electrical device 2 is connected to an electrical power supply system 6, in the present exemplary embodiment an AC voltage power supply system, by means of a suitable connecting device 5. The electrical device 2 can draw electrical energy from the power supply system 6 or output electrical energy thereto. In this case, this may effect either a feed of active power or reactive power into the connected electrical power supply system, depending on the configuration or topology of the electrical device.

The electrical device 2 further comprises a first environmental sensor 7, which is fastened to a housing of the electrical device 2 and is designed for measuring a temperature at the electrical device 2. In addition, the electrical device comprises a second environmental sensor 8, which is arranged within the housing and is suitable for measuring an air humidity in an environment of the electrical device 2.

Both the first and the second environmental sensors are designed to transmit the respectively detected environmental information, by means of the data link 4, to the control device 3. The first environmental sensor is additionally designed to preprocess and buffer-store the environmental information.

The method according to the invention can be illustrated below by means of the assembly 1. The control device 3 transmits, via the data link 4, a control signal to the electrical device 2. The electrical device 2 assumes, depending on the control signal, a first operating state, in which it exchanges energy with the power supply system, or a second operating state, in which it does not exchange any energy with the power supply system. Only in the case where the electrical device 2 assumes the second operating state does the environmental information provided by the two environmental sensors get transmitted, via the data link 4, to the control device 3.

FIG. 2 shows an assembly 10 having an electrical device 11 and a control device 21. The electrical device 11 comprises two semiconductor switches 12, 13 which can be switched off and an energy store 18, which are connected to one another in a half-bridge circuit. The first semiconductor switch 12 is arranged in a bridge branch 22 between a first and a second terminal 14 and 15, respectively, of the electrical device 11. The energy store 18 can be bypassed by means of the first semiconductor switch 12. The terminals 14 and 15 serve to connect the electrical device 11 to further electrical devices of the same type and/or to one or more electrical power supply systems (not illustrated figuratively in FIG. 2). The second semiconductor switch 13 and the energy store 18 are arranged in parallel with the first semiconductor switch 12. A first freewheeling diode 16 is connected back-to-back in parallel with the first semiconductor switch 12, and a second freewheeling diode 17 is connected back-to-back in parallel with the second semiconductor switch 13.

The electrical device 11 furthermore comprises a drive assembly 19, which performs the driving of the two semiconductor switches 12, 13. The drive assembly 19 is connected on the input side to a data link in the form of a fiberoptic conductor link 23 and is connected by means of the fiberoptic conductor link 23 to a control device 21. The control device 21 transmits control signals to the electrical device 11 and at the same time receives status information from the electrical device 11. The status information includes information on the switching states of the semiconductor switches 12, 13 ("on" or "off") and a voltage at the energy store 18. Further status information can be a voltage at the terminals 14, 15 or a current through the electrical device 11.

The electrical device 11 can assume a first operating state, in which the first semiconductor switch 12 is off. In this first operating state, the electrical device 11 can draw electrical energy from the connected electrical power supply system or output electrical energy to the power supply system, depending on the polarity of the current or the voltage, by means of the energy store 18. The electrical device 11 can furthermore assume a second operating state, in which the first semiconductor switch 12 is on. In this second operating state, the energy store 18 is bypassed, with the result that there is no energy exchange with the connected power supply system.

In the first operating state, there are considerable voltage and current changes. Correspondingly, in particular the status information in the first operating state needs to be transmitted in relatively short time intervals, i.e. with a high data rate. In the first operating state, this subjects the data link 23 to a high level of loading. In the second operating state, the loading of the data link 23 is correspondingly lower.

The electrical device 11 furthermore comprises an environmental sensor 20. The environmental sensor 20 is fastened, physically outside, on a housing 24 of the electrical device 11. The environmental sensor 20 in the example illustrated here comprises a plurality of sensor components and is designed to detect a temperature, an air humidity, an air pressure and vibrations at the housing 24 and to make this information available as environmental information. The environmental sensor has an interface 25, which makes it possible to connect the environmental sensor 20 to the fiberoptic conductor link 23. Thus, the environmental information can be transmitted to the control device 21 by means of the fiberoptic conductor link. Alternatively, the environmental sensor 20 can be connected to the drive assembly 19, so that the environmental information can be transmitted, via the drive assembly 19, to the control device 21. The drive assembly 19 can additionally perform the function of a data-processing unit, by means of which the environmental information can be preprocessed and/or buffer-stored.

If the status information from which it is apparent that the electrical device 11 is in the second operating state is transmitted to the control device 21, the control device 21 transmits a request to the electrical device 11 to transmit the environmental information. The environmental information is distributed, for example, between a first and a third data packet. These two data packets are then transmitted alternately with a second and a fourth data packet, which each contain status information, to the control device 21 (i.e. in the order: first, second, third, fourth data packet).

If, at a later point in time, the electrical device 11 assumes the first operating state, the transmission of the environmental information is not continued until the electrical device again changes to the second operating state.

The invention claimed is:

1. A method for operating a controllable electrical device being a switching module of a multilevel converter, the method comprising:

connecting the switching module of the multilevel converter through a data link to a control device for controlling the switching module;

using the switching module to exchange electrical energy with a connected electrical power supply system and providing the switching module with an environmental sensor for detecting environmental information;

transmitting a temperature measurement of an external temperature in an immediate environment of the switching module or a measurement of vibrations at a housing of the switching module, as the environmental information;

using the control device to transmit control signals through the data link to the switching module;

placing the switching module in a first or a second operating state depending on the transmitted control signals, the switching module, in the first operating state, exchanging energy with the electrical power supply system, the switching module, in the second operating state, not exchanging any energy with the electrical power supply system; and transmitting the environmental information detected by the environmental sensor through the data link to the control device only when the switching module is in the second operating state.

2. The method according to claim 1, which further comprises using the switching module to transmit status information through the data link to the control device and using the control device to generate the control signals while taking the status information into consideration.

3. The method according to claim 2, which further comprises transmitting the environmental information and the status information in mutually alternating data packets.

4. The method according to claim 2, which further comprises transmitting at least one of a quantity of energy to be exchanged with the power supply system or information regarding the operating state of the switching module, as the status information.

5. The method according to claim 2, which further comprises providing the switching module with semiconductor switches configured to be switched off, and transmitting switching states of the semiconductor switches as the status information.

6. The method according to claim 1, which further comprises:

at least one of using a data-processing device of the switching module to process the environmental information or using a data storage unit of the switching module to buffer-store the environmental information, prior to transmitting the environmental information to the control device; and transmitting the processed or buffer-stored environmental information to the control device.

7. The method according to claim 1, which further comprises transmitting at least one of an air humidity or an air pressure at the switching module, as the environmental information.

8. The method according to claim 1, which further comprises:

providing the switching module with an energy storage device;

using the energy storage device to exchange energy with the electrical power supply system in the first operating state of the switching module; and bypassing the energy storage device in the second operating state of the switching module, resulting in no energy exchange between the switching module and the electrical power supply system.

9. An assembly being a modular multilevel converter, comprising:
- a controllable electrical device being a switching module of the modular multilevel converter, said switching module configured to exchange electrical energy with a connected electrical power supply system;
- a data link; and
- a control device connected through said data link to said control device for controlling said switching module, said control device configured to transmit control signals through said data link to said switching module;
- said switching module configured to assume a first or a second operating state depending on said transmitted control signals, said switching module, in said first operating state, configured to exchange energy with the electrical power supply system, and said switching module, in said second operating state, being prevented from exchanging any energy with the electrical power supply system;
- said switching module including an environmental sensor for detecting environmental information and said switching module configured to transmit the environmental information detected by said environmental sensor through said data link to said control device only when said switching module is in said second operating state;
- said environmental information being a temperature measurement of an external temperature in an immediate environment of said switching module or a measurement of vibrations at a housing of said switching module.

10. The assembly according to claim 9, wherein said switching module includes at least one of a data-processing device or a data storage unit, said environmental information, prior to being transmitted to said control device, being at least one of processed by said data-processing device or buffer-stored by said data storage unit of said switching module, and said processed or buffer-stored environmental information being transmitted to said control device.

11. The assembly according to claim 9, wherein said environmental sensor is configured to detect information including at least one of an air humidity or an air pressure at said switching module and to make said information available, as said environmental information, to said switching module.

12. The assembly according to claim 9, wherein said switching module includes semiconductor switches configured to be switched off, and said semiconductor switches have switching states to be transmitted as status information.

13. The assembly according to claim 9, wherein said switching module includes an energy storage device, said switching module, in said first operating state, exchanging energy through said energy storage device with the electrical power supply system, and said energy storage device being bypassed in said second operating state of said switching module resulting in no energy exchange between said switching module and the electrical power supply system.

14. The assembly according to claim 9, wherein said switching module, during operation, is at an electrical potential of over 1 kV, said control device is at an electrical potential of less than 100 V, and said data link is a fiberoptic conductor link.

15. The assembly according to claim 9, wherein the assembly includes a multiplicity of switching modules.

* * * * *